(12) United States Patent
Marchisseau (10) Patent No.: US 6,739,442 B2
(45) Date of Patent: May 25, 2004

(54) FRICTION DISC AND METHOD FOR MAKING A LINING FORMING IT

(75) Inventor: Michel Marchisseau, Limoges (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 10/149,222

(22) PCT Filed: Nov. 16, 2001

(86) PCT No.: PCT/FR01/03593
§ 371 (c)(1),
(2), (4) Date: Aug. 26, 2002

(87) PCT Pub. No.: WO02/40885
PCT Pub. Date: May 23, 2002

(65) Prior Publication Data
US 2003/0029687 A1 Feb. 13, 2003

(30) Foreign Application Priority Data
Nov. 20, 2000 (FR) .......................... 00 14928

(51) Int. Cl.⁷ .............................. F16D 13/64
(52) U.S. Cl. ............... 192/52.6; 192/107 C; 156/60
(58) Field of Search ............... 192/52.6, 52.3, 192/107 C, 200, 70.17; 156/154, 60

(56) References Cited

U.S. PATENT DOCUMENTS

| | | | |
|---|---|---|---|
| 2,027,650 A | * | 1/1936 | Nutt ........................ 192/107 C |
| 2,222,507 A | | 11/1940 | Hunt |
| 2,337,135 A | | 12/1943 | Thelander |
| 2,742,992 A | * | 4/1956 | Timm ........................ 192/107 C |
| 4,345,676 A | | 8/1982 | Jarvis |
| 4,671,399 A | * | 6/1987 | Ooga ........................ 192/107 C |
| 4,697,683 A | | 10/1987 | Granton et al. |
| 4,714,148 A | | 12/1987 | Alas et al. |
| 4,821,860 A | | 4/1989 | Crawford et al. |
| 5,305,864 A | | 4/1994 | Strohm |
| 5,452,783 A | * | 9/1995 | Thirion De Briel et al. 192/107 C |
| 5,553,695 A | * | 9/1996 | Lutz et al. ............... 192/107 C |
| 6,015,035 A | | 1/2000 | Mizukami |
| 6,267,216 B1 | * | 7/2001 | Thirion De Briel et al. 192/107 C |

FOREIGN PATENT DOCUMENTS

| | | |
|---|---|---|
| EP | 0 579 554 A2 | 1/1994 |
| FR | 2 583 482 A | 12/1986 |
| GB | 459006 | 12/1936 |

* cited by examiner

Primary Examiner—Rodney H. Bonck
(74) Attorney, Agent, or Firm—Liniak, Berenato & White (57) ABSTRACT

The friction disk (24) includes a support web (28) the outer peripheral portion (40) of which is sub-divided into radial blades (42) offset axially from the central fixing part (44) with respect to the general plane of the web (28), and including friction linings (30, 32) on either side of the peripheral portion (40), each lining (30, 32) including, on the one hand, a fixing surface (64, 66) a fixing area (62) of which is fixed onto at least one central part (44) of a radial blade (42), and, on the other hand, a reduced-thickness area (72), in an area separate from the fixing areas (62); at least one reinforcing element (74) extends face-to-face with at least a part of a reduced-thickness area.

The invention also proposes a method of manufacturing a friction lining (30, 32) of the type described above.

27 Claims, 9 Drawing Sheets

FRICTION DISC AND METHOD FOR MAKING A LINING FORMING IT

TECHNICAL FIELD OF THE INVENTION

The invention proposes a friction disk, especially for a motor-vehicle dry clutch.

The invention more particularly proposes a friction disk, especially a dry-clutch friction disk for a motor vehicle.

STATE OF THE ART

In a known way, the friction disk includes a support web in the form of an annular washer, the outer peripheral portion of which is subdivided into radial blades which, by virtue of folds, feature a central fixing part which is connected to the central portion of the web by a tangential fold which forms the foot of the blade and which is perpendicular.

The tangential fold allows an axial offset of the central fixing part with respect to the general plane of the central portion of the web. Friction linings are fixed on either side of the outer peripheral portion, for example by riveting or by bonding. Each friction lining comprises an outer friction surface and an inner fixing surface, a fixing area of which is fixed onto at least one lateral fixing face of a central part of a radial blade which is offset axially towards the said friction lining.

Such a design is illustrated, for example, in the document EP-A-0.579.554 (U.S. Pat. No. 5,452,783).

When such a friction disk is used for transmission of the rotational movement of the engine of a motor vehicle to the wheels, the central portion of the web is linked to the primary shaft of a gearbox either directly or by way of elastic members.

When it is being used in a clutch device, the radial periphery of the friction disk, especially the friction linings, is clamped axially between a pressure plate and a reaction plate. The plates are driven in rotation by the engine flywheel. The axial offset of the central fixing part of the blades with respect to the general plane of the central portion of the web and the mechanism for linking to the clutch pedal make it possible to obtain the application of the axial load, from a zero value up to the rated value of this axial load which is characteristic of the setting of the clutch, during a part of the movement of the clutch pedal, which is the active clutch-engagement phase. During the active clutch-engagement phase, the two linings of the friction disk approach one another over a distance called progressiveness travel. The graphical representation of the axial force of the pressure plates on the friction as a function of the relative movement of two linings under this force is called progressiveness curve. At the end of the clutch-engagement phase, depending on the setting and the characteristics of the clutch, the axial offset of the central fixing part of the blades with respect to the general plane of the central portion of the web may be practically cancelled out.

During the clutch-engagement phase, the axial clamping load is transmitted to the friction surfaces of the lining by the surfaces of the pressure and reaction action plates which are face-to-face.

The axial offset of the central fixing part of the blades is not cancelled out during this operating phase. The friction lining therefore bear essentially on the lateral fixing faces of the blades. The distribution of the pressures over the friction surfaces of the lining is therefore not uniform.

Moreover, at the start of the active clutch-engagement phase, the rotational speeds of the engine flywheel and of the primary shaft of the gearbox are not homokinetic. This difference in rotation induces friction between the pressure plate and one of the linings, as well as between the reaction plate and the other lining.

The energy dissipated by the friction between the linings and the pressure and reaction plates, as well as the heating and the wear induced on the linings, are increasing functions of the pressure between the friction linings and the plates. Thus, during the clutch-engagement phase, the wear on the friction surfaces of the friction linings is therefore more rapid facing their fixing areas.

The areas of the fixing surfaces of the linings, which are not fixing areas and which are not in contact with the support web, are called free areas, and they transmit a lower pressure in the course of the active clutch-engagement phase and, consequently, wear out less rapidly.

Thus, the free areas of the linings are pushed back overall by the plates, and become thicker in step with the wear on the areas of the friction surfaces facing the fixing areas.

Moreover, the high temperatures and stresses, especially in the areas of the friction surfaces facing the fixing areas, cause permanent deformations, for example by the phenomenon of creep.

The cumulated effect of these deformations is called incrustation.

Incrustation is therefore manifested as an overthickness of friction material in the region of the free areas, protruding with respect to the plane passing through the inner fixing surfaces of the linings. This friction material of the free areas, protruding, comes into contact with the lateral faces of the blades which are opposite the lateral fixing faces, during the active clutch-engagement phase, before the progressiveness travel is terminated.

Whenever free areas are in contact with the peripheral part of the web, these free areas participate in the transmission of the axial force exerted by the pressure and reaction plates, at a level equivalent to the participation of the fixing areas.

In this case, if the differential in the rotational speeds between the two friction linings and the pressure and reaction plates is not zero, the speeds of wearing of the portions of the friction surfaces, on the one hand facing free areas in contact with the web, on the other hand facing fixing areas, are similar.

The greater the incrustation of the friction linings, the more the free areas rapidly come into contact with the peripheral portion of the web, in the course of the active clutch-engagement phase.

When the rotational speeds of the engine flywheel and of the primary shaft of the gearbox are homokinetic, there is no friction between the pressure and reaction plates, on the one hand, and the linings, on the other hand. The wearing of the linings does not change.

When the active clutch-engagement phase is terminated, if the differential in the rotational speeds between the two linings and the pressure plates is not zero, the clutch slips. The slipping of the clutch induces wear which diminishes the differences in thickness of the free areas between the linings until the thicknesses of these free areas become uniform.

When the linings are not incrusted, the progressiveness curve of the friction is a monotonic, increasing and continuous function. The slope of this curve grows with the relative approach of the two linings, up to a finite value.

When the linings are incrusted, we can distinguish two periods. The first period corresponds to the relative movement between two linings from the free state until the first, thickest free area comes into contact with the support web. The part of the progressiveness curve corresponding to this first period remains monotonic, increasing and continuous. The second period corresponds to the residual application of the axial load transmitted by the pressure plates. The complementary part of the progressiveness curve corresponding to this second period commences with a break point with a substantial augmentation of the slope. In general, the slope tends towards infinity towards the end of this second period. The progressiveness travel is reduced.

Incrustation therefore has a negative impact on the driving comfort of the vehicle during the clutch-engagement phase. This is because, during the passage from the first to the second period, the torque transmitted by the friction disk as a function of the axial force, that is to say of the axial movement of the pressure and reaction plates towards one another, varies abruptly.

The abrupt variation in transmission of the torque causes a jolt which impairs the driving comfort of the vehicle.

During the first period, the transmission of the torque is achieved in large measure by the areas of the outer friction surface of the linings face-to-face with the fixing areas.

During the second period, the transmission of the torque is achieved by practically all the outer friction surface of the linings.

OBJECT OF THE INVENTION

The present invention makes it possible particularly to increase the duration of use of the friction disk during which incrustation has no negative impact on comfort, so as to increase the duration during which the driving comfort of the vehicle is optimal.

The invention thus makes it possible to even out the distribution of the pressures on the friction surfaces of the linings, which makes it possible, on the one hand, to reduce the speed of incrustation as well as the speed of wear and, on the other hand, to increase the performance of the clutch, that is to say for identical friction surfaces of the linings, the friction disk according to the invention exhibits an increased lifetime and makes it possible to transmit a higher torque.

To that end, the invention proposes a friction disk, especially a motor-vehicle dry-clutch friction disk, including a support web in the form of an annular washer comprising a central portion and a outer peripheral portion subdivided into radial blades featuring a central fixing part connected to the central portion of the web by a tangential fold which forms the foot of the blade and allows an axial offset of the central fixing part with respect to the general plane of the central portion of the web, and including friction linings on either side of the outer peripheral portion, each friction lining including an outer friction surface and an inner fixing surface a fixing area of which is fixed onto at least one lateral fixing face of a central part of a radial blade which is offset axially towards the said friction lining, characterised in that an inner surface of a friction lining includes a reduced-thickness area, or thinned area, in an area separate from the fixing areas, so as locally to reduce the axial thickness of the friction lining, and in that at least one reinforcing element extends facing at least one part of a reduced-thickness area of the friction lining in such a way as to promote the uniform distribution of the pressures over the friction surface of the lining when it is stressed axially by a complementary plate.

By virtue of the invention, the quantity of friction material is reduced, while having good mechanical behaviour of the friction linings by virtue of the reinforcing element, such that the solution is economical.

According to other characteristics of the invention:

for a good distribution of the pressures and good parallelism of the friction linings, at least one of the radial blades features, in addition to the central part, at least one peripheral bearing-surface part a lateral bearing-surface face of which comes into abutment on a bearing-surface area of the inner surface of a lining which is opposite the lining on the inner surface of which is fixed the lateral fixing face of the central part of the radial blade;

the reinforcing element extends at least partially face-to-face with a lateral bearing-surface face of a peripheral part of a radial blade;

at least one reinforcing element extends substantially face-to-face with the inner periphery of the inner surface of at least one friction lining;

several reinforcing elements arranged between the inner surface of a lining and the web of the support are linked together so as to constitute a single element;

the single element includes a ring, the inner diameter of which corresponds substantially to the inner diameter of the lining facing which it extends, and branches which extend radially from the outer diameter of the ring towards the outer periphery of the lining;

at least one of the branches extends face-to-face with a lateral bearing-surface face of a peripheral part of a radial blade;

the reinforcing element includes a reinforcing sector bearing against at least one part of the reduced-thickness area, and at least one support lug which extends axially from the reinforcing sector towards the web against which it bears so as to enhance the uniformity of the distribution of the pressures over the friction surface of the friction lining;

at least one support lug bears on the lateral face opposite the lateral fixing face of the facing blade;

at least one support lug bears on the facing lateral face of the central portion of the radial web;

the support lug is produced from an elastic material so that it undergoes an axial deformation which is a function of the axial force exerted, by a plate, on the friction surface of the facing lining;

at least one support lug is obtained by cutting-out and/or folding of the reinforcing element to which it belongs;

at least one of the linings consists of blocks or tiles delimited by edges of overall radial orientation;

at least one of the linings consists of a continuous ring.

The invention also proposes a method of manufacturing a friction lining, for a motor-vehicle clutch friction disk as described above, characterised in that it includes a stage of firing the friction material of the friction lining in a mould the area of which which is in contact with the fixing surface of the lining includes at least one boss, so as to produce at least one reduced-thickness area or thinned area.

According to other characteristics of the method:

the friction material is injected into the mould;

it includes a stage of machining the fixing face of the friction lining so as to produce at least one reduced-thickness area or thinned area;

at least one reinforcing element is fixed to an element of the friction disk;

at least one reinforcing element is fixed to the support web;

at least one reinforcing element is fixed to the friction lining;

the friction lining is produced by overmoulding around a reinforcing element;

at least one reinforcing element is bonded onto an element of the friction disk;

at least one reinforcing element is riveted onto an element of the friction disk;

at least one of the linings is bonded onto a fixing surface of a radial blade of the support web.

BRIEF DESCRIPTION OF THE DRAWINGS

Other characteristics and advantages of the invention will become apparent on reading the detailed description which follows, for an understanding of which reference will be made to the attached drawings, in which.

DESCRIPTION OF PREFERRED EMBODIMENTS OF THE INVENTION

In the remainder of the description, an axial and transverse orientation will be used in a nonlimiting way, in accordance with the orientation of the rotational axis X—X of the friction disk and with a transverse plane which is perpendicular to it. Moreover, an internal, external orientation will be used with respect to the median transverse plane of the friction disk.

Figure 1:
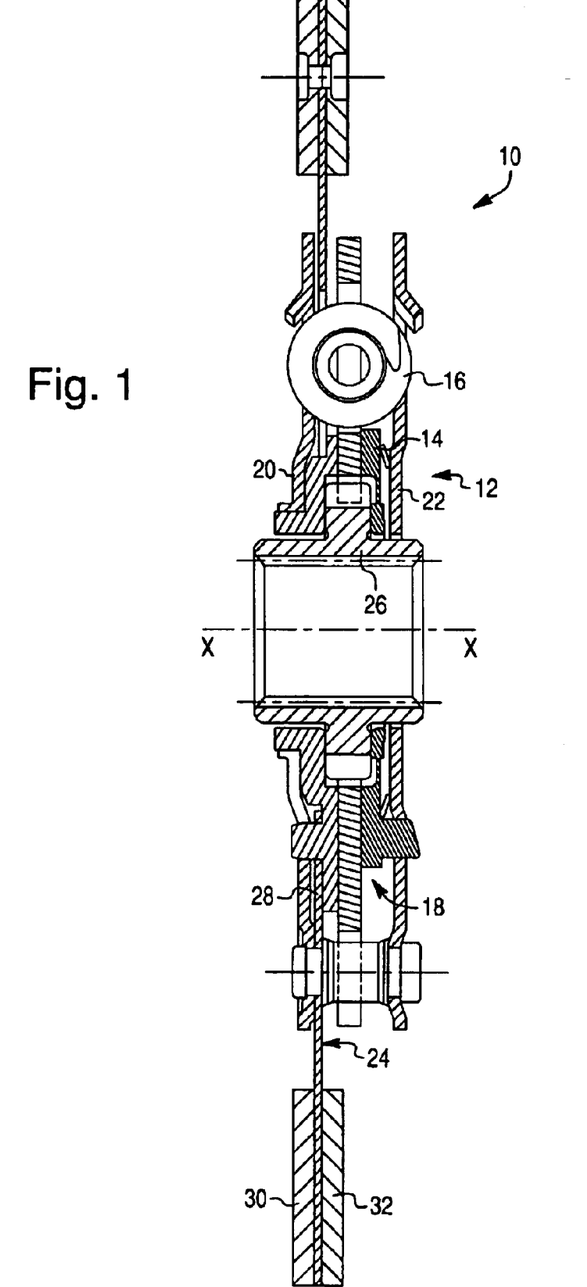
FIG. 1 is a view in axial section of a friction device equipped with a friction disk.

FIG. 1 represents a view in axial section of a friction device 10 intended especially for producing a motor-vehicle clutch.

Such a device is described in the document EP-A-0 579 554, to which reference will be made for further details.

Thus, the friction device 10 includes a first and a second coaxial part 12, 14 respectively mounted mobile with respect to one another counter to circumferentially acting elastic members 16 and axially acting friction means 18.

By way of example, the first coaxial part 12 includes two guide washers 20 and 22.

A friction disk 24 is fixed, for example by riveting, onto the washer 20.

The second coaxial part 14 is integral with a hub 26 intended for the rotational drive of the primary shaft, with axis of rotation X—X, of a gearbox which is not represented.

The friction disk 24 consists mainly of a support web 28 on the outer annular periphery of which friction linings 30 and 32 are affixed.

The web 28 is a component made of cut-out and folded thin sheet metal.

The friction linings 30 and 32 may consist of a continuous ring, or of blocks delimited by edges of overall radial orientation.

Thus, during a clutch-engagement phase, pressure and reaction plates (not represented), which are integral with the engine flywheel, come to progressively axially clamp the friction faces 34 and 36 of the friction linings 30 and 32 respectively, so as to drive the primary shaft of the gearbox in rotation by way of the friction disk 10.

Figure 2:
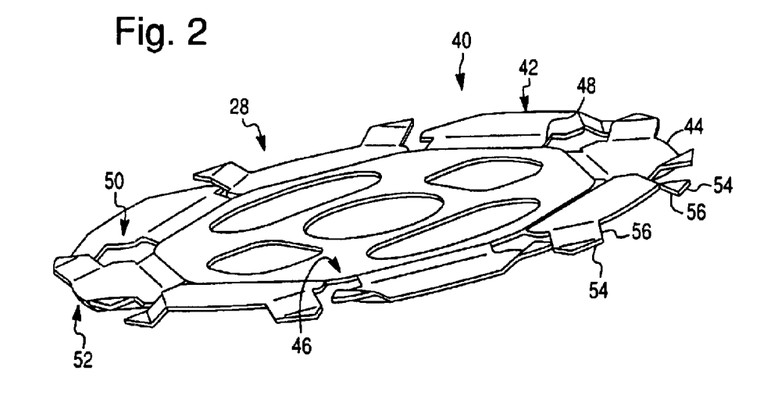
FIG. 2 is a view in perspective of a support web of a friction disk.

FIG. 2 represents, in perspective, the support web 28 in the form of an annular washer the outer peripheral portion 40 of which here is subdivided into radial blades 42 and the central portion 46 of which includes clearance windows for the elastic members 16, here in the form of coil springs.

Each radial blade 42 consists of a central fixing part 44 connected to a central portion 46 of the web 28 by a tangential fold 48 which forms the foot of the blade 42 and which allows an axial offset of the central fixing part 44 with respect to the general plane of the central portion 46 of the web 28.

The fold 48 extends perpendicularly to the axis of radial symmetry R1 of the blade 42.

The plane of the central portion 46 defines a median transverse plane of the friction disk 24.

The web 28 here includes eight radial blades 42 which are distributed at regular angles around the X—X axis.

The radial blades 42 are alternately offset axially with respect to the central potion 46 in such a way that the central parts 44 define an upper plane 50 and a lower plane 52, with respect to the median transverse plane of the central portion 46 of the web 28, particularly in accordance with FIG. 2.

According to a known design, known especially from the document EP-A-0.579.554, each blade 42 is of the type called "tripod" blade. Thus, each radial blade 42 features, in addition to the central fixing part 44, two peripheral bearing-surface parts 54.

Each tripod blade 42 features general symmetry of design with respect to a median radial axis R1.

Thus the two peripheral bearing-surface parts 54 are arranged tangentially on either side of the central fixing part 44 which itself features symmetry of design [sic] respect to the radial axis of symmetry R1.

The two peripheral bearing-surface parts 54 are flat. They are situated in an axially offset plane. Here, they are situated in the upper plane 50 when the central fixing part 44 is situated in the lower plane 52 and conversely.

The peripheral bearing-surface parts 54 of a blade 42 are connected to the central fixing part 44 by a fold 56.

Thus, the upper 50 and lower 52 planes include the central fixing part 44 of a radial blade 42 and the two pairs of peripheral bearing-surface part 54 of the two adjacent radial blades 42.

Figure 3:
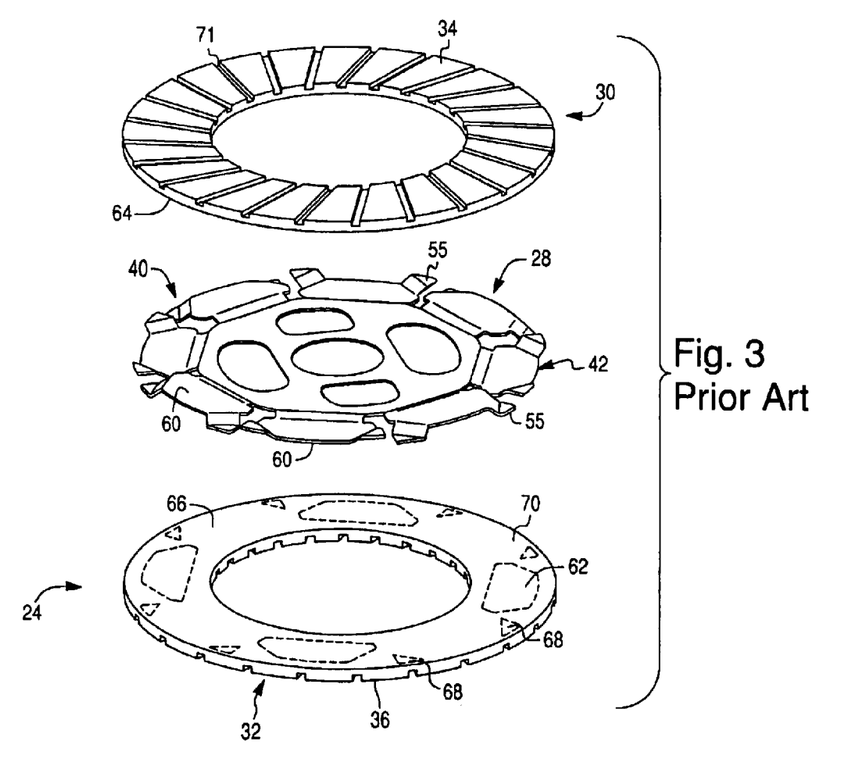
FIG. 3 is an exploded view in perspective of a friction disk according to the state of the art.

When the friction disk 24 is fitted, a lateral fixing face 60 of each central fixing part 44 comes into contact, over a fixing area 62, delimited by dashed lines in the figures, especially in FIG. 3, with an inner fixing face 64 and 66 of the friction linings 30 and 32 respectively.

The fixing of the central parts 44 and of the friction linings 30 and 32 can be achieved by riveting or, advantageously, by bonding so as to reduce the inertia of the friction disk and/or allow greater wear of the friction linings.

Moreover, lateral bearing-surface faces 55 of the peripheral bearing-surface parts 54 of a central fixing part 44 come into abutment on bearing-surface areas 68, delimited by dashed lines in the figures, of the lining 32, 30 opposite the one onto which the corresponding central part 44 is fixed.

Here, the lateral bearing-surface faces 55 are simply bearing on the bearing-surface areas 68 opposite, so as to allow slipping of the peripheral bearing-surface parts 54 with respect to the corresponding lining 32, 32 during the clutch-engagement phase which causes the linings 32, 30 to come closer together axially, and consequently causes deformation of the web 28.

The areas of the inner fixing surfaces 64 and 66 of the friction linings 30 and 32 which are neither fixing areas 62 nor bearing-surface areas 68 are called free areas 70.

In order to optimise the cooling of the friction linings 30 and 32, the friction faces 34 and 36 include grooves 71 of overall radial orientation which are oriented slightly inclined with respect to a radial direction.

Figure 4:
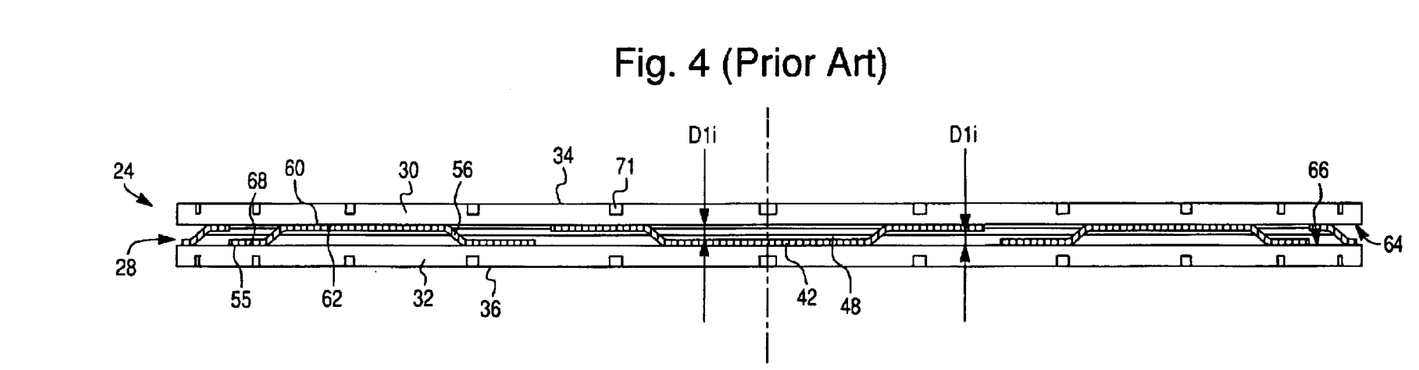
FIG. 4 is an end view of a friction disk according to the state of the art in the new state, fitted and in a state corresponding to the open position of the clutch.

FIG. 4 represents, in end view, the friction disk 24 as fitted in a position called open position. The friction disk is in the new state, that is to say that the outer friction surfaces 34 and 36 of the friction linings 30 and 32 are not worn.

The fixing surfaces 64 and 66 of the friction linings 30 and 32 and the lateral faces of the blades 42 which are opposite the lateral fixing faces 60 are separated by a distance D, here initial distance $D1i$.

This distance $D1i$ is seen again between the fixing surfaces 64 and 66 of the friction linings 30 and 32 and the faces of the peripheral bearing-surface parts 54 which are opposite the bearing-surface faces 55.

During a clutch-engagement phase, the pressure and reaction plates come into contact with the outer friction surfaces 34 and 36 of the friction linings 30 and 32. Each plate exerts an opposite axial force which tends to bring the friction linings 30 and 32 axially together. As the speeds of the friction disk 24 and of the plates are not homokinetic, friction occurs between the surfaces in contact, which tends to drive the friction disk 24 in rotation.

The opposed axial forces of the plates compress the friction disk 24 axially in such a way as to deform the web 28, especially the folds 48 and 56, as far as a clamped position in which the resisting force of the web 28 is equal to the opposed axial forces.

Figure 5:
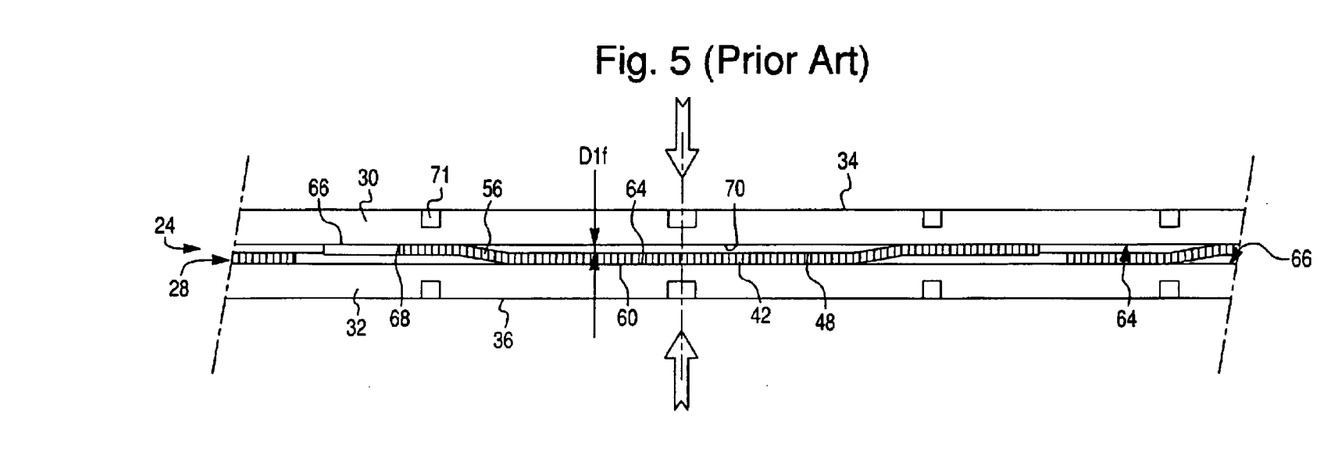
FIG. 5 is an end view similar to that represented in FIG. 4, on a larger scale, the friction disk being represented in a state corresponding to the closed position of the clutch.

FIG. 5 represents, in end view, the friction disk 24 in the new state in its clamped position.

Thus, in the course of the clutch-engagement phase, the deformation of the folds 48 and 56 makes it possible to provide the progressiveness of the clutch.

In this position, the fixing surfaces 64 and 66 of the friction linings 30 and 32, and the lateral faces of the blades 42 which are opposite the lateral fixing faces 60 are separated by a final distance $D1f$.

However, the use of the friction disk 24 causes wear on the friction surfaces 34 and 36 of the friction linings 30 and 32, as well as deformation thereof.

The wear on the friction linings 30 and 32 is proportional to the friction pressures exerted. Hence, the wear on the friction surfaces 34 and 36 will be greater in the areas face-to-face with fixing areas 62 and bearing-surface areas 68 of the fixing surfaces 64 and 66 respectively.

Although the linings 30 and 32 are less worn face-to-face with the free areas 70, they undergo deformation, that is to say that the thickness of the linings 30 and 32 face-to-face with the free areas 70 is deformed, pushed back overall, by the plates towards the web 28. This is the phenomenon of incrustation.

Figure 6:
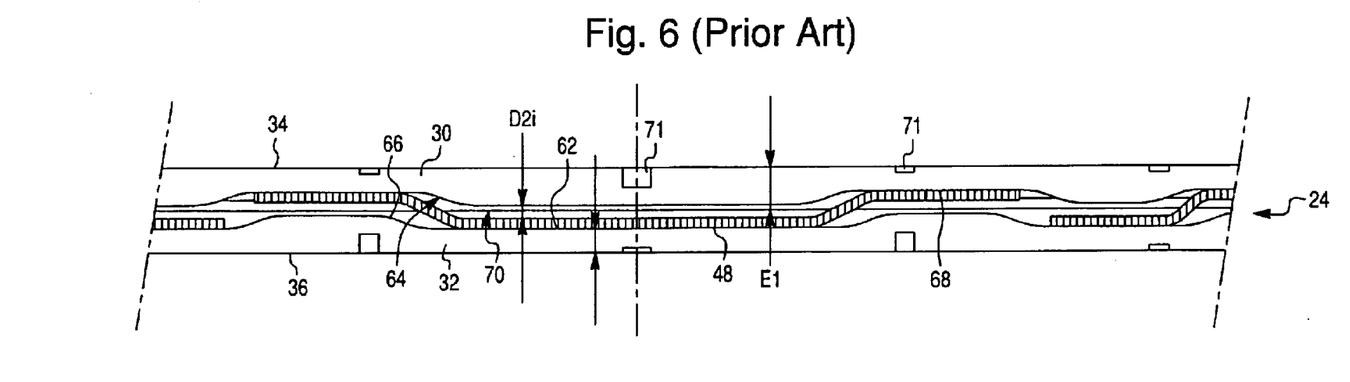
FIG. 6 is an end view similar to that represented in FIG. 4, on a larger scale, the friction linings of the friction disk being incrusted.

FIG. 6 represents the worn friction disk 24 in open position.

It will be observed then that the linings 30 and 32 no longer have a constant thickness E. The areas face-to-face with the fixing areas 62 and with bearing-surface areas 68 of the fixing surfaces 64 and 66 respectively have a first, reduced thickness $E1$, and the areas face-to-face with the free areas 70 have a second thickness $E2$ greater than the first thickness $E1$.

Here, the dimensions of the areas face-to-face with the central parts 44 are larger than those of the peripheral bearing-surface parts 54 and their deformation is greater.

FIG. 6 illustrates the deformation of the areas face-to-face with the free areas 70. The distance $D2i$ which separates the fixing surfaces 64 and 66 of the friction linings 30 and 32, and the lateral faces of the blades 42 which are opposite the lateral fixing faces 60, is reduced with respect to the distance $D1i$.

Hence, when the incrustation is greater a first threshold, or when the distance $D2i$ is less than a second threshold, the progressiveness of the clutch is no longer regular.

In effect, two periods are produced, as described above.

In the course of the first period, the progressiveness of the clutch is regular, but the change to the second period causes a jolt which corresponds to the coming into contact of a free area 70 of a fixing surface 64 or 66 with the lateral face of a blade 42 which is opposite the lateral fixing face 60.

Figure 7:
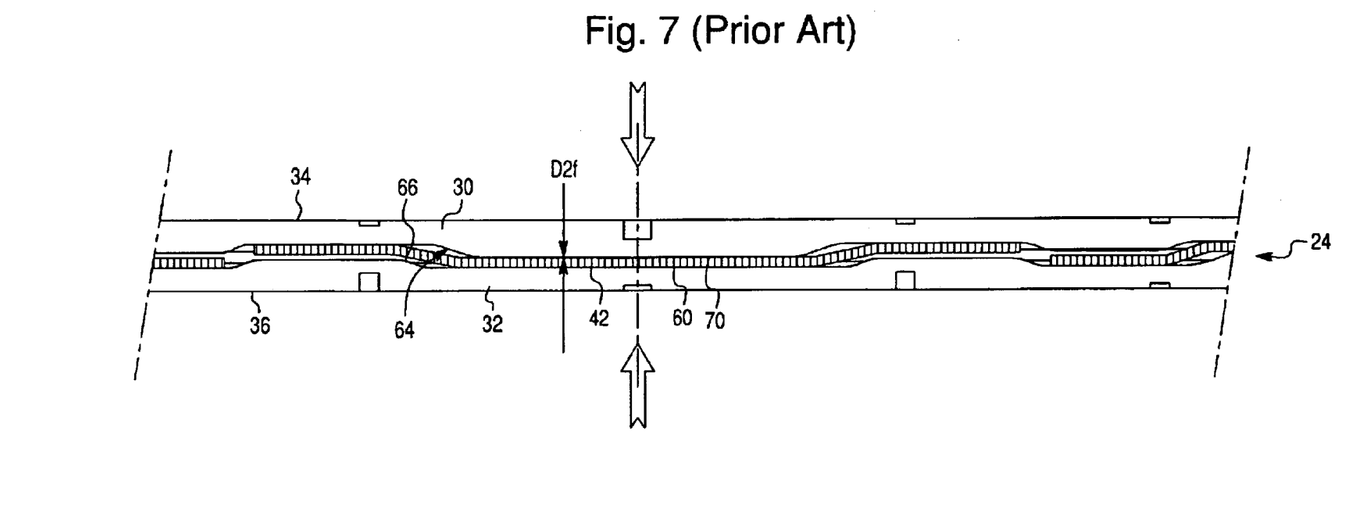
FIG. 7 is an end view similar to that represented in FIG. 6, the friction disk being represented in a state corresponding to the closed position of the clutch.

FIG. 7 represents the worn friction disk 24 in the clamped position of the clutch. The free areas 70 of the fixing surfaces 64 or 66 are in contact with the lateral face of a blade 42 which is opposite the lateral fixing face 60, the distance $D2f$ is zero.

If the deformation of the free areas 70 is not regular about the axis X—X, several jolts can occur, which each correspond to the coming into contact of a free area 70 of a fixing surface 64 or 66 with a lateral face of a blade 42 which is opposite the lateral fixing face 60.

In order to augment the duration of use of the friction disk 24 during which the phenomena of incrustation and of deformation do not alter the progressiveness of the clutch, it is proposed to reduce or to thin a part of the free areas 70 so as locally to reduce the axial thickness of the friction linings 30, 32. The areas thus produced are called reduced-thickness areas 72.

Figure 8:
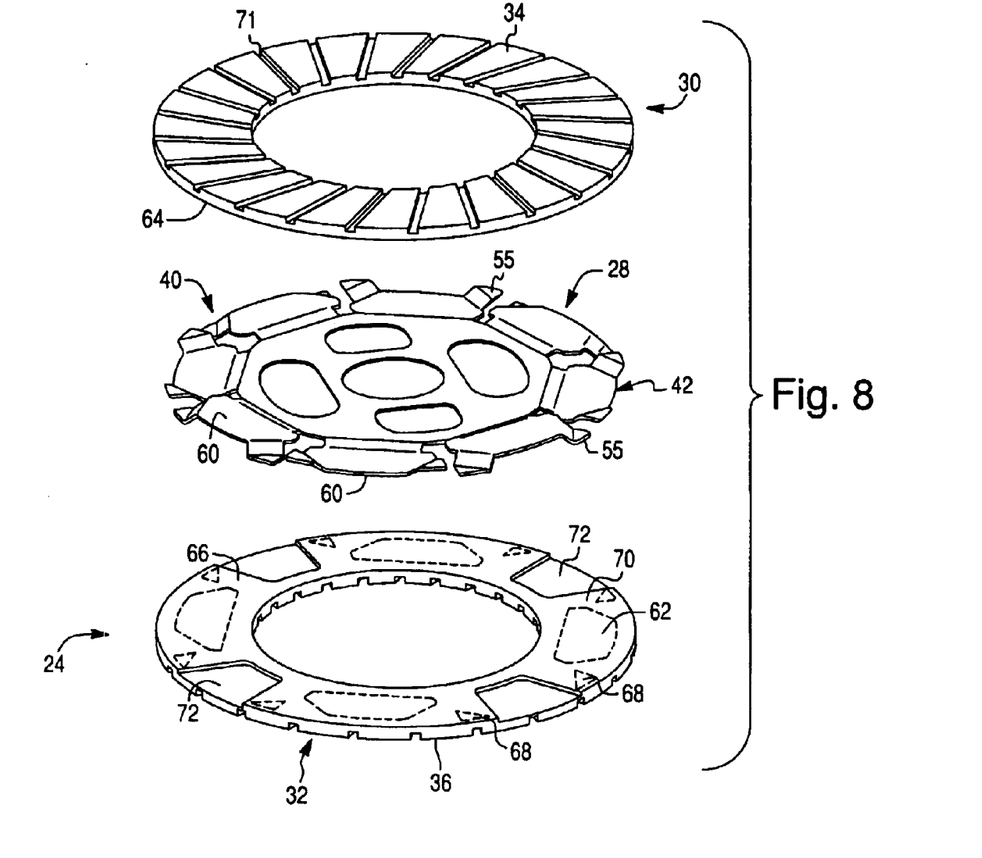
FIG. 8 is an exploded view in perspective of a friction disk produced in accordance with the invention.

FIG. 8 represents such an embodiment, in exploded perspective. The reduced-thickness areas 72 have been produced here only in the areas face-to-face with the lateral faces of the blades 42 which are opposite the lateral fixing faces 60.

Figure 9:
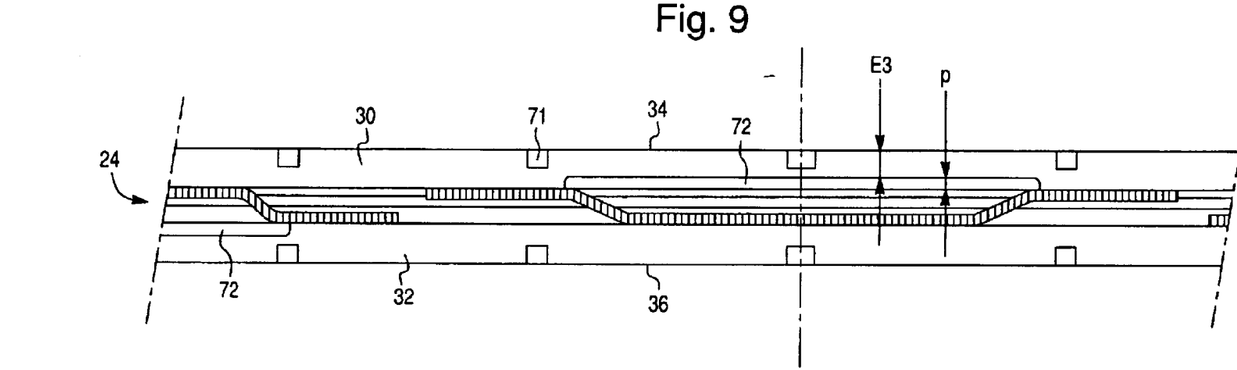
FIG. 9 is an end view of a friction disk according to the invention in the new state, fitted and in a state corresponding to the open position of the clutch.
Figure 10:
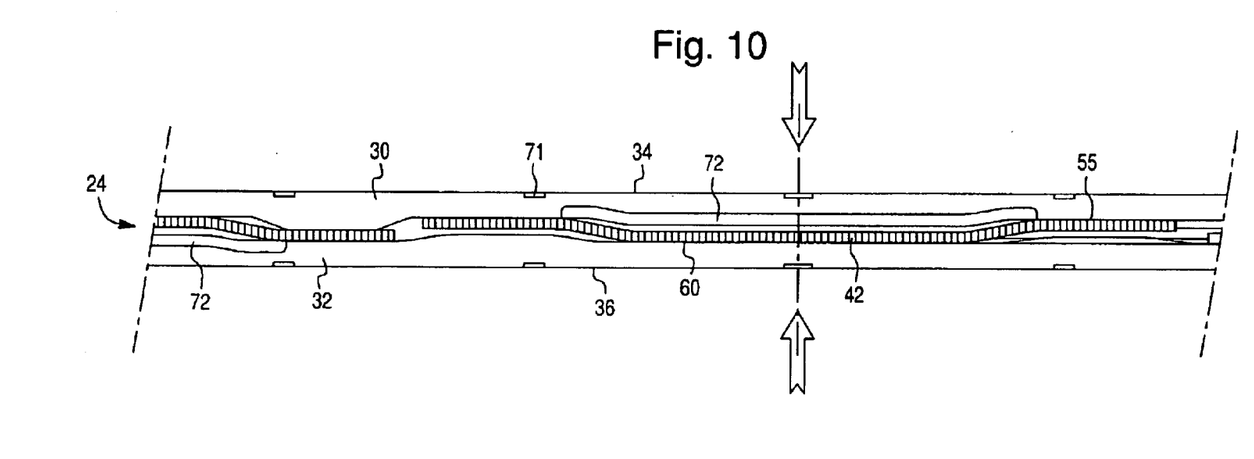
FIG. 10 is an end view similar to that represented in FIG. 9, the friction disk being represented in a state corresponding to the closed position of the clutch and the linings being worn.

FIG. 9 is an end view of the friction disk 24, in the new state, according to the invention, in the open position of the clutch.

Advantageously, the thickness E3 of the friction linings 30 and 32 in the reduced-thickness areas 72 and the depth P of the reduced-thickness areas 72 are determined so that, when the linings 30, 32 have reached their maximum wear, the progressiveness travel is not substantially altered by comparison with the new state.

Here, although the free areas 70 face-to-face with the peripheral bearing-surface parts 54 are not reduced-thickness areas 72, the duration of use of the friction disk 24 during which the phenomena of incrustation do not alter the progressiveness of the clutch is longer than the lifetime of the friction disk, according to the state of the art. This is because these free areas 70 have an overhang which is very much less than the overhang of the free areas 70 face-to-face with the central parts 44. The speed of incrustation of the free areas 70 face-to-face with the peripheral bearing-surface parts 54 is therefore much less than the speed of incrustation of the free areas 70 face-to-face with the central parts 44.

The friction disk 24 also makes it possible to reduce the quantity of friction material employed for its manufacture. The mass of the friction linings 30 and 32 is diminished, which reduces their inertia and which makes it possible to increase the speed of rotation or of centrifugation of the friction disk 24. In effect, the stresses which result from the rotation of the friction disk 24 are lower for the same rotational speed.

Figure 11:
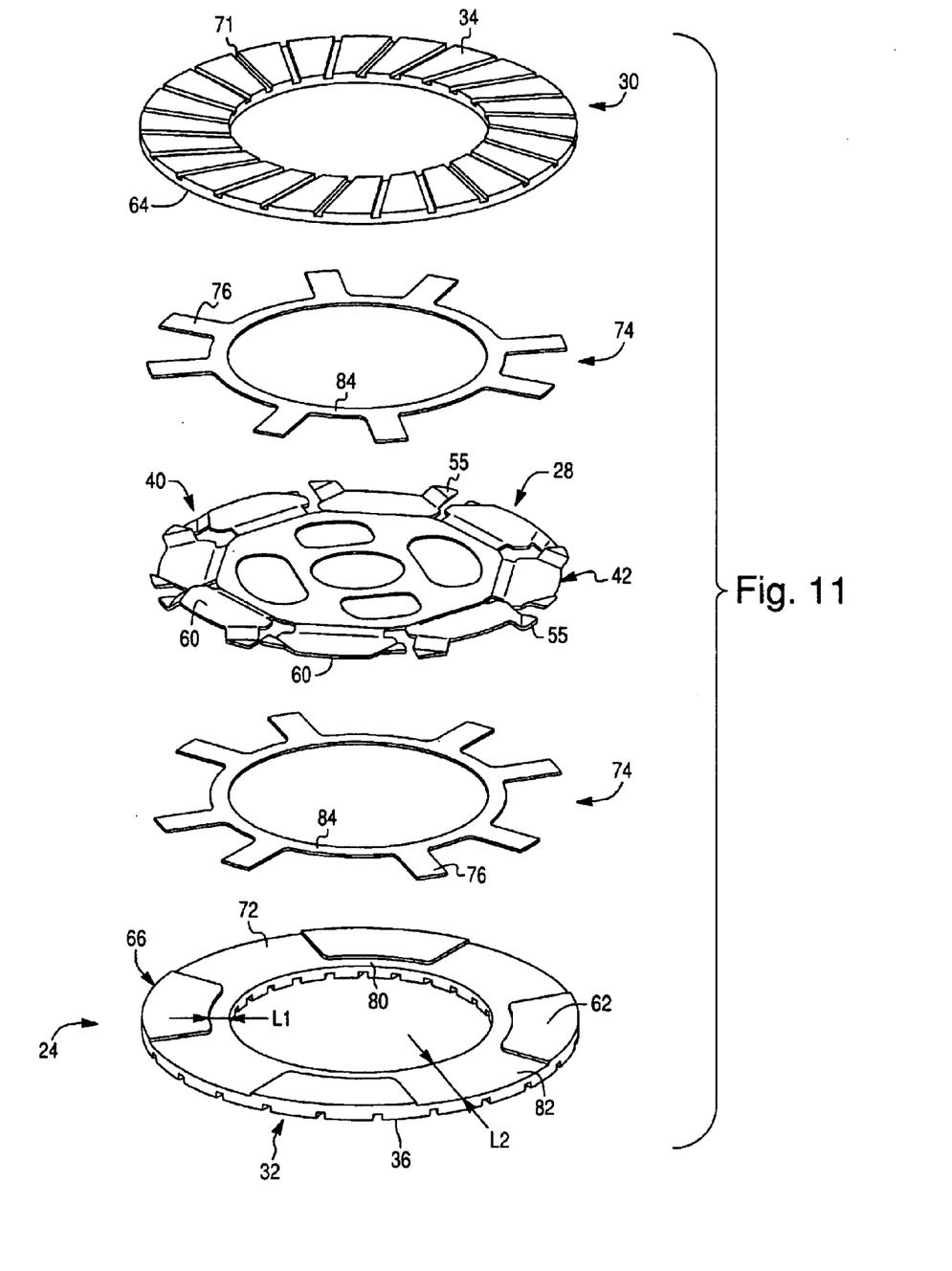
FIG. 11 is an exploded view in perspective of a friction disk including a reinforcing element according to a first variant of the invention.

According to a first embodiment of the invention, in accordance with FIG. 11, the reduced-thickness areas 72 correspond to all the areas of the fixing surfaces 64 and 66 of the friction linings 30 and 32 which are separate from the fixing areas 62.

In order to promote the uniform distribution of the pressures over the friction surfaces 34 and 36 when they are stressed axially by the pressure and reaction plates, according to the invention a reinforcing element 74 such as a branch 76 extends over the back of the reduced-thickness areas 72.

The reinforcing element 74 is manufactured from a material, such as steel or a plastic the mechanical characteristics of which are higher than those of the friction material of the linings 30 and 32, so as to resist higher pressures without damage.

Each reinforcing element 74 may be simply interposed between a friction lining 30 or 32 and the support web 28. It may also be fixed onto the support web 28 or onto a lining 30 or 32 for example by bonding, riveting or welding.

It is also possible for one of the friction linings 30 or 32 to be produced by overmoulding around a reinforcing element 74.

Figure 12:
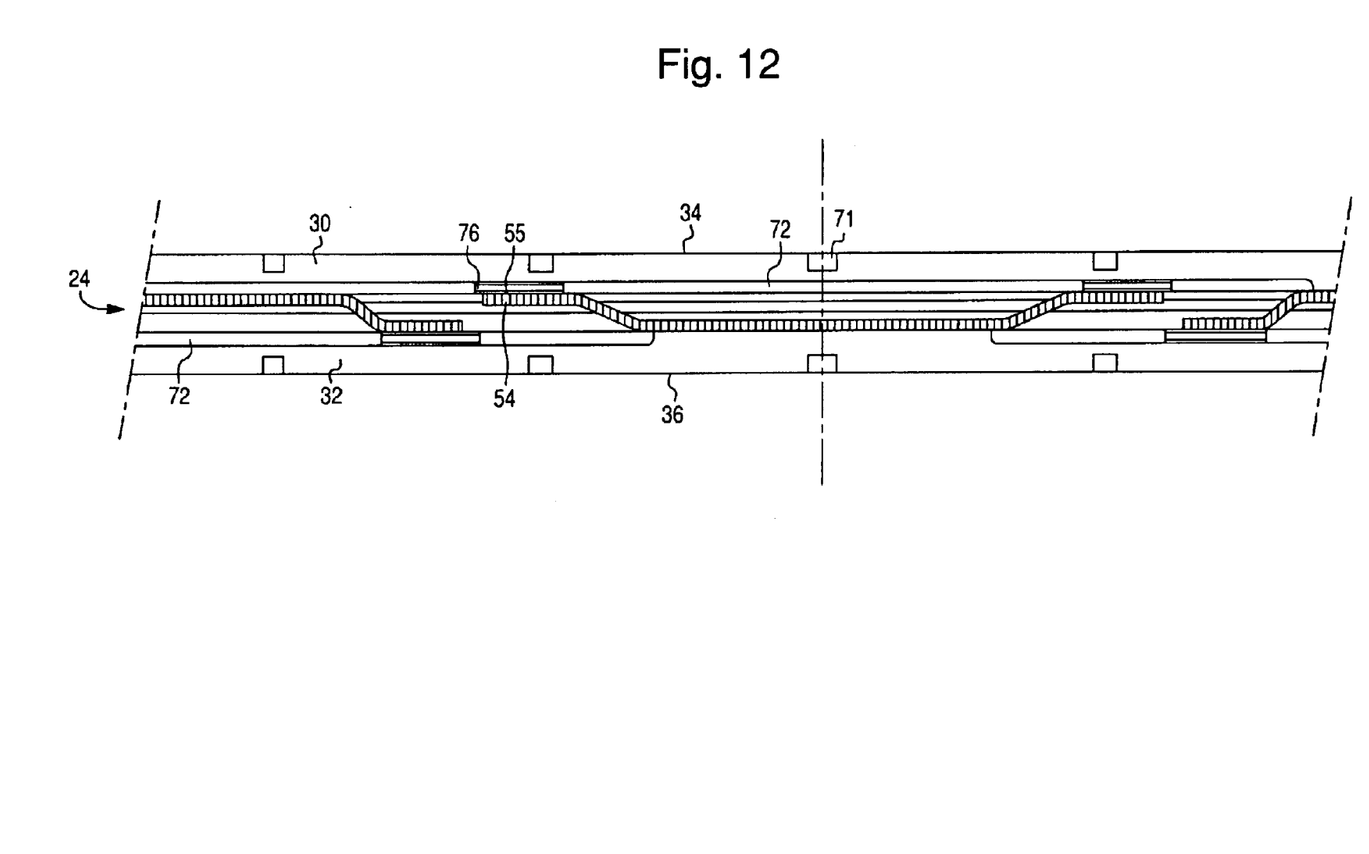
FIG. 12 is an end view of a friction disk according to the first variant of the invention.

As represented in the end view of the friction disk of FIG. 12, the branches 76 advantageously extend face-to-face with a lateral bearing-surface face 55 of the peripheral bearing-surface part 54.

In order to prevent vibration from the peripheral bearing-surface parts 54, it is necessary to eliminate the play between the lateral bearing-surface faces 55 and the branches 76. Hence, if it is desired to keep the shaping of the web 28, the thickness of the branches 76 is equal to the depth P of the reduced-thickness areas 72, so that the inner face of the branch 76 comes flush with the fixing surface 64, 66 of the friction lining 30, 32.

Hence, when the friction surfaces 34 and 36 are stressed axially by the plates, the branches 76, the dimensions of which are greater than those of the lateral bearing-surface faces 55, make it possible to distribute the forces exerted by the said bearing-surface faces 55 onto a larger area of the friction surfaces 34 and 36.

With the forces being better distributed, that makes it possible to reduce the friction pressures between the friction surfaces 34 and 36, and the pressure and reaction plates, which has the consequence of reducing the wear on the areas of the friction surfaces 34 and 36 face-to-face with the lateral bearing-surface faces 55. The lifetime of the friction disk 24 is increased.

Moreover, such an embodiment makes it possible to reduce the dimensions of the bearing-surface faces 55 and to increase those of the lateral fixing faces 60 of the blades 42. Hence, when the linings 30 and 32 are fixed onto the support web 28 by bonding, the increase in the dimensions of the lateral fixing faces 60 makes it possible to increase the bonding surface areas and consequently to raise the torque-handling capacity between the linings 30 and 32 and the web 28.

According to FIG. 11, the reduced-thickness areas 72 correspond to the whole of the fixing surfaces 64 and 66 of the friction linings 30 and 32, except for the fixing areas 62.

Hence, the reduced-thickness areas 72 include an annular area 80 which extends from the inner periphery of the fixing surfaces 64 and 66 of the friction linings 30 and 32 outwards as far as the fixing areas 62. Advantageously, the width L1 of the annular areas corresponds substantially to a third of the width L2 of the friction linings 30 and 32. The reduced-thickness areas 72 also include ring portions 82 which extend between the fixing areas 62 from the annular area 80 as far as the outer periphery of the fixing surfaces 64 and 66 of the linings 30 and 32.

The reinforcing element 74 of each friction lining 30, 32 may then include a ring 84 the dimensions of which correspond substantially to the annular area 80, as well as branches 76 which are arranged radially on either side of each fixing area 62 and which extend from the outer diameter of the ring 84 towards the outer periphery of the corresponding friction lining 30 and 32. Hence, a single reinforcing element 74 is affixed to the reduced-thickness areas 72 of each friction lining 30 and 32.

Hence, when the friction surfaces 34 and 36 are stressed axially by the plates, the reinforcing elements 74 make it possible to distribute the forces exerted by the bearing-surface faces 55 over a substantial area of the friction surfaces 34 and 36. The contact pressures between the linings 30 and 32 and plates are therefore reduced, which makes it possible further to augment the lifetime of the friction disk 24.

Advantageously, the dimensions and especially the thickness of the reinforcing elements 74, as well as the material of which they are composed are chosen in such a way that when the friction surfaces 34 and 36 of the friction linings 30 and 32 are worn, neither the inner faces of the reinforcing elements 74, nor the free areas 70 of the fixing surfaces 64 and 66 are in contact with a part of the web throughout the active clutch-engagement phase. Such an embodiment makes it possible to preserve intact the progressiveness travel and the continuity of the progressiveness curve of the clutch throughout the lifetime of the friction device 10.

This embodiment also makes it possible to improve the resistance of the friction disk 24 to centrifugation.

This is because, upon rotation of the friction linings 30 and 32, the mechanical stresses induced are at a maximum on the inner diameter of the linings 30 and 32. However, the material constituting the rings 84 exhibits a mechanical strength greater than that of the material constituting the friction linings 30 and 32. The rings 84 than it possible to reinforce the friction linings 30 and 32 in the areas which are the most stressed mechanically.

It is thus possible, for identical dimensions of the linings 30 and 32, to increase the stresses due to the centrifugation, and thus to increase the rotational speed of the friction disk 24, without risking it being damaged.

Figures 13, 14, 15:
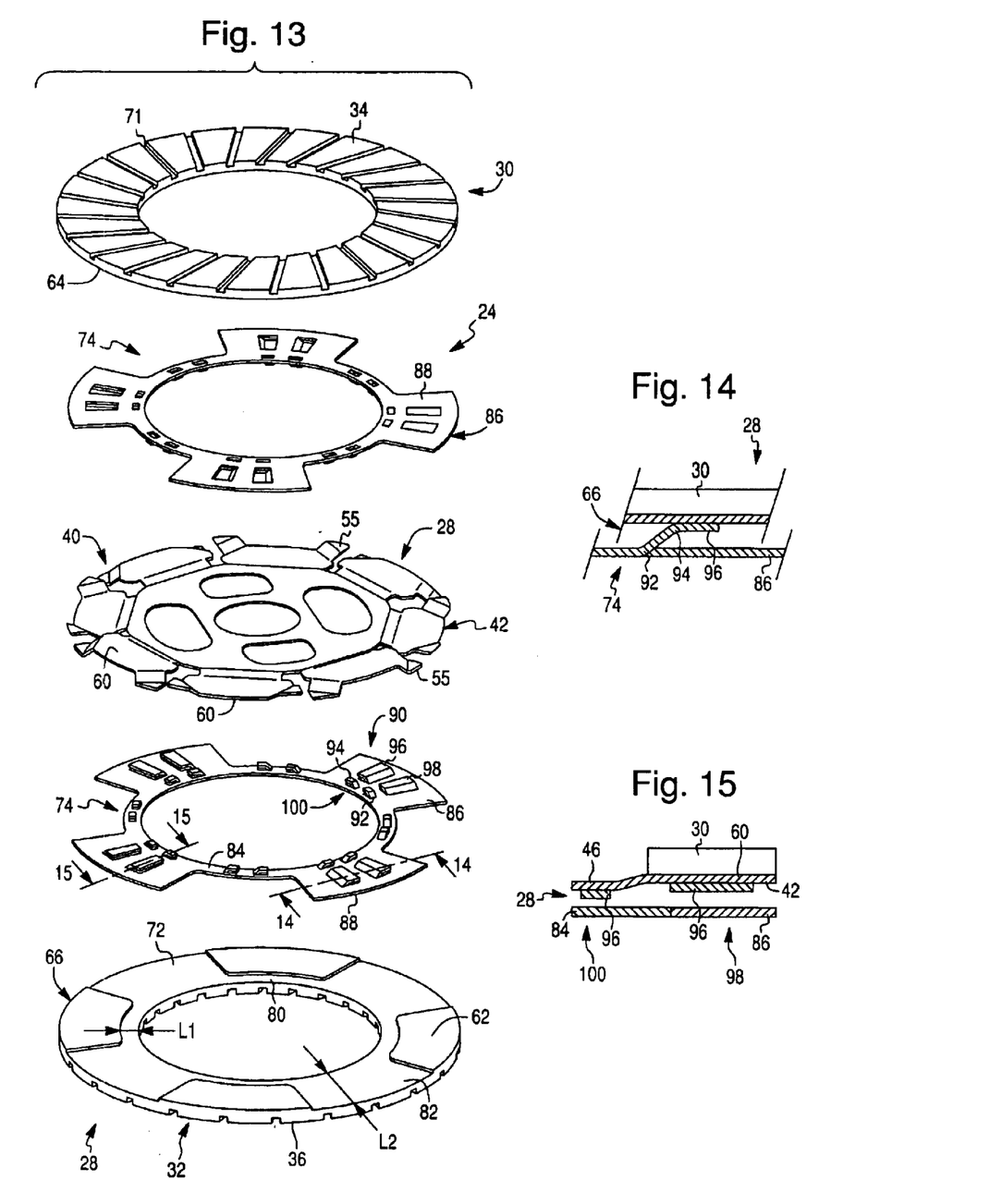
FIG. 13 is an exploded view in perspective of a friction disk including a reinforcing element according to a second variant of the invention.
FIG. 14 is a sectional view along the line 14—14 represented in FIG. 13.
FIG. 15 is a sectional view along the line 15—15 represented in FIG. 13.

In order further to increase the uniformity of the distribution of the contact pressures between the friction surfaces 34 and 36 of the linings 30 and 32, the branches 76 (FIG. 13) are produced in pairs in such a way as to form reinforcing sectors 86 which extend face-to-face with ring portions 82 of the reduced-thickness areas 72, in accordance with a second variant represented in FIG. 13. This makes it possible to reduce the speed of wear of the friction surfaces 34 and 36 as well as the speed of incrustation during the clutch-engagement phase.

According to this embodiment, the outer faces 88 of the reinforcing sectors 86 or body are in abutment against the face-to-face part of the reduced-thickness area 72. The reinforcing sectors 86 include support lugs 90.

In accordance with FIG. 14, each support lug 90 extends axially overall from a reinforcing sector 86 towards the web 28 against which it abuts, so as to transmit the reaction forces from the web 28 towards one of the friction linings 30 or 32, when the friction disk 24 is stressed axially by the pressure and reaction plates.

The support lugs 90 can be produced by cutting out and folding a part of the reinforcing element 74. In fact, a U-shaped cut-out is first of all formed, inclined by 90 degrees with respect to a radial direction of the reinforcing element 74. A first bend 92 is formed between the free extremity of each of the branches of the cut-out in such a way that the folded part extends axially towards the support web 28, then a second bend 94 makes it possible to fold down the free end 96 of the folded part in a transverse plane parallel to that of the reinforcing element 74.

This embodiment of the support lugs 90 makes it possible to confer elasticity on them, especially along an axial direction. Hence, when the friction disk 24 is stressed axially by the pressure and reaction plates, they are slightly deformable axially, as a function of the axial forces exerted by the plates on the friction surfaces of the friction linings 30 and 32, which makes it possible to transmit the reaction forces from the web 28 towards one of the friction linings 30 or 32 while ensuring the progressiveness of the clutch-engagement phase.

The axial deformation of the support lugs 90 is a function of the axial forces exerted by the plates on the friction surfaces of the friction linings 30 and 32.

The axial deformation of the support lugs 90 may, for example, be proportional or exponential with respect to the axial forces exerted by the plates, that is to say that there exists a linear or exponential relationship between axial deformation of the support lugs 90 and the axial forces exerted by the plates respectively.

The free extremity 96 of the support lug 90 may bear on the opposite lateral face of the lateral fixing face 60 of the blade 42 opposite, in accordance with FIGS. 14 and 15.

In this case it may be advantageous for the radial dimension of the lug 98 to correspond substantially to the radial dimension of the reinforcing sector 86 on which it is produced so as to increase the surface area of the free extremity 96 in contact with the radial blade 42 of the web 28.

The support lug 90 may also be produced in the reinforcing ring 84. It is then referenced 100, and its free extremity 96 may then bear on the opposite lateral face of the central portion 46 of the radial web 28.

FIG. 15, which is a sectional view along the line 15—15 of FIG. 13, especially represents the support lugs 98 and 100 which are respectively in contact with a radial blade 42 the central portion 46 of the web 28. Thus, the lug 98 extends axially over a greater distance than the lug 100.

The reaction forces from the support web 28 are then transmitted into the areas of the friction surfaces 34 and 36 face-to-face with reduced-thickness areas 72, thus allowing a substantial reduction in the incrustation of the linings 34 and 36, as well as the uniform distribution of the pressures over practically the whole of the friction surfaces 34 and 36.

Such a friction disk 24 according to the invention allows optimum use of the friction linings 34 and 36. This is because the friction pressures are distributed substantially uniformly over the whole of the friction surfaces 34 and 36. Hence, the angular differences in the speeds of wear of the linings 34 and 36, as well as the phenomena of incrustation, are greatly reduced.

Consequently, the speed of wear of the linings 34 and 36 is greatly reduced, which makes it possible to augment the lifetime of the friction disk 24 and its ease of use for the clutch-engagement phase.

The invention also proposes a method of manufacturing a friction lining 30 or 32, especially for a motor-vehicle clutch friction disk 24.

Thus, the method includes a stage of firing the friction material of the lining 30 or 32 in a mould, the area of which which is in contact with the fixing surface 64 or 66 of the lining 30 or 32 respectively includes a boss in such a way as to form a reduced-thickness or thinned area 72.

When the friction material of the lining 30, 32 is based on fibres, such as glass fibres, the mould may consist of two parts, each of the parts including a part of the imprint of the lining 30, 32. Thus, the friction material is arranged in one of the two matrices then the other matrix comes into abutment against the first one so as to close the imprint and to form the lining 30, 32.

The friction material may also be injected directly into an imprint corresponding to the outer shape or envelope of the lining 30, 32.

The friction material is then hardened, for example by heating before being extracted from the mould.

One variant consists in producing one lining 30, 32 the fixing surface 64, 66 of which is flat, then in machining this face so as to form a reduced-thickness area 72.

When the friction lining 30, 32 is finished, a reinforcing element 74 can be fixed to it, for example by bonding or by riveting.

The friction lining 30, 32 may also be overmoulded around the reinforcing element 74.

The bonding of the friction linings onto the central fixing area or part 44 of the support web is advantageously carried out with the aid of a pad. More precisely, adhesive is deposited on the parts 44 with the aid of a pad which includes an adhesive-application area the shape of which corresponds to the area of bonding of the lateral fixing face 60 of the central part 44.

In a first phase, the adhesive-application area of the pad is impregnated with adhesive, then, in a second phase, the impregnated adhesive-application area of the pad and the adhesive area of the lateral fixing face 60 of the central part 44 are brought into contact under pressure so as to transfer the predetermined quantity of the adhesive from the pad onto the blade, as described in the application FR 00 14929 filed on Nov. 20, 2000, to which reference should be made for further details.

Advantageously, the clutch includes a pressure plate in several parts belonging to a device for compensating for the wear of the friction linings, called wear-take-up device.

This wear-take-up device includes, for example, a cartridge featuring a worm-screw and ratchet-wheel assembly carried by the cover which the clutch includes, as described, for example, in the document FR-A-2753 503 to which reference should be made for further details.

The pressure plate therefore includes a first part forming the pressure plate and carrying a ring with ramps constituting a second part of the pressure plate.

The friction disk may belong to a friction-clutch/rotating-electric-machine assembly as described in the document FR-A-2 782 355; the reaction plate then being integral with the rotating electric machine.

This document should be referred to for further details.

Needless to say, in a variant, the fixing of the friction linings by bonding is achieved according to the method described in the document WO-A-98/44272, that is to say with the aid of beads of adhesive.

It will be appreciated that the fixing part of the blades is of large extent in FIGS. 11 and 13.

This is due to the fact that the peripheral bearing-surface parts extend symmetrically with respect to the central fixing part.

In a variant, the peripheral bearing-surface parts extend asymmetrically with respect to the central fixing part, such that the blades can be in flag form.

Needless to say, it is possible to increase the surface area of these peripheral bearing-surface areas. In any case, the reinforcing element extends face-to-face with at least a part of a reduced-thickness area of the friction lining so as to promote the uniform distribution of the pressures over the friction surface of the lining when it is stressed axially by a complementary plate.

It will be noted that the reinforcing element of FIGS. 11 and 13 is of low mass. The branches 76 and the support lugs 90 alternate circumferentially with the central parts 44.

What is claimed is:

1. Friction disk (24), including a support web (28) in the form of an annular washer comprising a central portion (46) and a outer peripheral portion subdivided into radial blades (42) featuring a central fixing part (44) connected to the central portion (46) of the web (28) by a tangential fold (48) which forms a foot of the blade (42) and allows an axial offset of the central fixing part (44) with respect to the general plane of the central portion (46) of the web (28), and including friction linings (30, 32) on either side of the outer peripheral portion (40), each friction lining (30, 32) including an outer friction surface (34, 36) and an inner fixing surface (64, 66) a fixing area (62) of which is fixed onto at least one lateral fixing face (60) of a central part (44) of a radial blade (42) which is offset axially towards the said friction lining (30, 32) wherein a fixing surface (64, 66) of a friction lining (30, 32) includes a reduced-thickness area (72), or thinned area, in an area separate from the fixing areas (62), so as locally to reduce the axial thickness of the friction lining (30, 32), and at least one reinforcing element (74) extends facing at least one part of a reduced-thickness area (72) of the friction lining (30, 32) in such a way as to promote the uniform distribution of the pressures over the friction surface (34, 36) of the lining (30, 32) when it is stressed axially by a complementary plate.

2. Friction disk (24) according to claim 1, wherein at least one of the radial blades (42) features, in addition to the central part (44), at least one peripheral bearing-surface part (54) a lateral bearing-surface face (55) of which comes into abutment on a bearing-surface area (68) of the inner surface of a lining (32, 30) which is opposite the lining (30, 32) on the inner surface (64, 66) of which is fixed the lateral fixing face (60) of the central part (44) of the radial blade (42).

3. Friction disk according to claim 2, wherein the reduced-thickness areas (72) correspond to an annular area (80) which extends from the inner periphery of the fixing surfaces (64, 66) of the friction linings (30, 32) outwards as far as the fixing areas (62).

4. Friction disk according to claim 3, wherein the width (L1) of the annular area (80) corresponds substantially to a third of the width (L2) of the friction linings (30, 32).

5. Friction disk (24) according to claim 3, wherein the reduced-thickness areas (72) also include ring portions (82) which extend between the fixing areas (62) from the annular area (80) as far as the outer periphery of the fixing surfaces (64, 66) of the friction linings (30, 32).

6. Friction disk (24) according to claim 3, wherein the reinforcing element (74) extends at least partially face-to-face with a lateral bearing-surface face (55) of a peripheral part (54) of a radial blade (42).

7. Friction disk (24) according to claim 6, wherein the at least one reinforcing element (74) extends substantially face-to-face with the inner periphery of the inner surface (64, 66) of at least one friction lining (30, 32).

8. Friction disk (24) according to claim 7, wherein the at least one reinforcing element (74) arranged between the inner surface (64, 66) of a lining (30, 32) and the web of the support (28) are linked together so as to constitute a single element (74).

9. Friction disk (24) according to the claim 8, wherein the single element (74) includes a ring (84) the inner diameter of which corresponds substantially to the inner diameter of the lining (30, 32) facing which it extends, and branches (76) which extend radially from the outer diameter of the ring (84) towards the outer periphery of the lining (30, 32).

10. Friction disk (24) according to the claim 9, wherein at least one of the branches (76) extends face-to-face with a lateral bearing-surface face (55) of a peripheral bearing-surface part (54) of a radial blade (42).

11. Friction disk (24) according to claim 9, wherein the thickness of the branches (76) is equal to a depth (P) of the reduced-thickness areas (72).

12. Friction disk (24) according to claim 1, wherein the reinforcing element (74) is manufactured from a material the mechanical characteristics of which are higher than those of the friction material of the friction linings (30, 32).

13. Friction disk (24) according to claim 1, wherein the reinforcing element (74) includes a reinforcing sector (86) bearing against at least one part of the reduced-thickness area (72), and at least one support lug (90) which extends axially from the reinforcing sector (86) towards the web (28) against which it bears so as to enhance the uniformity of the distribution of the pressures over the friction surface (34, 36) of the friction lining (30, 32).

14. Friction disk (24) according to the claim 13, wherein at least one support lug (98) bears on the lateral face opposite the lateral fixing face (60) of the facing blade (42).

15. Friction disk (24) according to claim 13, wherein at least one support lug (100) bears on the facing lateral face of the central portion (46) of the radial web (28).

16. Friction disk (24) according to claim 13, wherein the support lug (90) is produced from an elastic material so that it undergoes an axial deformation which is a function of the axial force exerted, by a plate, on the friction surface (34, 36) of the facing lining (30, 32).

17. Friction disk (24) according to claim 13, wherein at least one support lug (90) is obtained by cutting-out and/or folding of the reinforcing element (74) to which it belongs.

18. Friction disk (24) according to claim 1, wherein at least one of the linings (30, 32) includes a continuous ring.

19. Friction disk according to claim 1, wherein the friction linings are fixed by bonding onto the central fixing parts of the blades.

20. Method of manufacturing a friction lining (30, 32), for a motor-vehicle clutch friction disk according to claim 1, wherein it includes a stage of firing the friction material of the friction lining (30, 32) in a mould the area of which which is in contact with the fixing surface (64, 66) of the lining (30, 32) includes at least one boss, so as to produce at least one reduced-thickness area (72).

21. Method according to the claim 20, wherein the friction material is injected into the mould.

22. Manufacturing method according to claim 20, wherein at least one reinforcing element (74) is fixed to an element of the friction disk (24).

23. Manufacturing method according to the claim 22, wherein at least one reinforcing element (74) is fixed to the support web (28).

24. Manufacturing method according to claim 22, wherein at least one reinforcing element (74) is fixed to the friction lining (30, 32).

25. Manufacturing method according to the claim 24, wherein the friction lining (30, 32) is produced by over-moulding around a reinforcing element (74).

26. Manufacturing method according to claim 22, wherein at least one reinforcing element (74) is bonded onto an element of the friction disk (24).

27. Method of manufacturing a friction lining (30, 32), for a motor-vehicle clutch friction disk (24) according to claim 1, wherein it includes a stage of machining the fixing face (64, 66) of the lining (30, 32) so as to produce at least one reduced-thickness area (72).

* * * * *